(12) United States Patent
Sun et al.

(10) Patent No.: US 11,426,833 B2
(45) Date of Patent: Aug. 30, 2022

(54) CROSS-AXIS AND CROSS-POINT MODAL TESTING AND PARAMETER IDENTIFICATION METHOD FOR PREDICTING THE CUTTING STABILITY

(71) Applicant: DALIAN UNIVERSITY OF TECHNOLOGY, Dalian (CN)

(72) Inventors: Yuwen Sun, Dalian (CN); Shanglei Jiang, Dalian (CN)

(73) Assignee: DALIAN UNIVERSITY OF TECHNOLOGY, Dalian (CN)

(*) Notice: Subject to any disclaimer, the term of this patent is extended or adjusted under 35 U.S.C. 154(b) by 604 days.

(21) Appl. No.: 16/486,439

(22) PCT Filed: Sep. 13, 2018

(86) PCT No.: PCT/CN2018/105389
§ 371 (c)(1),
(2) Date: Aug. 15, 2019

(87) PCT Pub. No.: WO2020/051818
PCT Pub. Date: Mar. 19, 2020

(65) Prior Publication Data
US 2020/0230769 A1 Jul. 23, 2020

(51) Int. Cl.
*B23Q 17/09* (2006.01)
*B23Q 17/12* (2006.01)

(52) U.S. Cl.
CPC ......... *B23Q 17/0976* (2013.01); *B23Q 17/12* (2013.01)

(58) Field of Classification Search
CPC . B23Q 17/0904; B23Q 17/0976; B23Q 17/12
See application file for complete search history.

(56) References Cited

FOREIGN PATENT DOCUMENTS

| CN | 102554326 A | 7/2012 |
|---|---|---|
| CN | 103559550 A | 2/2014 |

(Continued)

OTHER PUBLICATIONS

Jiang et al., A multi order method for predicting stability, CSAA, 2017 (Year: 2017).*

(Continued)

*Primary Examiner* — Kyle R Quigley
(74) *Attorney, Agent, or Firm* — Muncy, Geissler, Olds & Lowe, P.C.

(57) ABSTRACT

The present invention provides a cross-axis and cross-point modal testing and parameter identification method for predicting the cutting stability, which is used to improve the accuracy of existing prediction methods of cutting stability. The method firstly installs a miniature tri-axial acceleration sensor at the tool tip, and conducts the cross-axis and cross-point experimental modal tests respectively. The measured transfer functions are grouped according to different measuring axes, and the dynamic parameters are separately identified from each group of transfer functions. Then, the contact region between the cutter and workpiece is divided into several cutting layer differentiators. After that, together with other dynamic parameters, all the parameters are assembled into system dynamic parameter matrices matching with the dynamic model. Finally, dynamic parameter matrices including the effects of cross-axis and cross-point model couplings are obtained. Moreover, the acceleration sensor in the method only needs to be installed once.

1 Claim, 1 Drawing Sheet

(56) References Cited

FOREIGN PATENT DOCUMENTS

| CN | 107423502 A | 12/2017 |
|---|---|---|
| CN | 107457609 A | 12/2017 |
| CN | 108958167 A | 12/2018 |

OTHER PUBLICATIONS

Sun et al., Predictive modeling of chatter stability, IJMTM, 2018 (Year: 2018).*

* cited by examiner

CROSS-AXIS AND CROSS-POINT MODAL TESTING AND PARAMETER IDENTIFICATION METHOD FOR PREDICTING THE CUTTING STABILITY

TECHNICAL FIELD

The present invention relates to a modal testing and parameter identification method for predicting the cutting stability. More particularly, the present invention relates to a cross-axis and cross-point modal testing and parameter identification method for predicting the cutting stability.

BACKGROUND

Stability prediction of cutting process is helpful to improve machining quality of parts, improve material removal rate, reduce tool wear, and avoid damage to machine spindle due to violent vibrations. At present, stability prediction of cutting process is usually achieved by drawing stability lobe diagram, that is, the machining parameter domain is divided by the calculated stability lobes into three different combinations which are stable, unstable and critically stable. On this basis, further design of chatter suppression scheme and optimization of chatter-free machining parameters can be carried out.

This kind of methods needs to establish a time-delay cutting dynamic equation, which involves the modal mass matrix, modal damping matrix, modal stiffness matrix and mode shape matrix. One of the key steps of implementing such methods is how to expand the corresponding modal analysis to obtain these dynamic parameter matrices accurately. By searching related literatures and patents, it can be found that existing modal analysis methods for the prediction of cutting stability mainly include the numerical simulation methods based on finite element analysis and the experimental testing methods based on hammer tests. The numerical simulation methods based on finite element analysis generally need to execute the precise mesh generation to the structure, which bring the loss of computational efficiency. At the same time, it is necessary to accurately establish, set and input the geometric model, boundary conditions and material parameters for the structure to be tested. These make the calculation accuracy difficult to guarantee.

On the other hand, because of has the advantages of model building simply, accurate computation and fast data processing, the experimental testing methods based on hammer tests have been widely studied and applied. Related literatures and patents of this kind of methods mainly focus on the acquisition of dynamic parameters at the tool tip. REF.1 (B. P. Mann, K. A. Young, T. L. Schmitz, D. N. Dilley, *Simultaneous Stability and Surface Location Error Predictions in Milling, Journal of Manufacturing Science and Engineering*. 127 (2005) 446) puts forward a prediction method of milling stability. This method, as shown in FIG. 1(a), establishes a mode-shape-normalized system dynamic equation at the tool tip (Node 1), impacting at the tool tip along 1X and 1Y directions by the hammer, respectively, and making sure a single-axial acceleration sensor that its response measuring direction is always consistent with the impact direction of the hammer. It requires two installations of the single-axial acceleration sensor in order to obtain the system dynamic parameters which are independent of each other at the tool tip. REF.2 (X.J. Zhang, C. H. Xiong, Y. Ding, M. J. Feng, Y. L. Xiong, *Milling stability analysis with simultaneously considering the structural mode coupling effect and regenerative effect, International Journal of Machine Tools and Manufacture*. 53 (2012) 127-140) considers the mode coupling effect of the dynamic parameters at tool tip. Its characteristics are: on the basis of the impact strategy presented in REF.1, impact tests with the response measuring direction of a single-axial acceleration sensor perpendicular to the impact direction of the hammer are supplemented, and the acceleration sensor still needs to be installed twice. Actually, this method takes into account dynamic characteristics of the cross-axis mode coupling of the cutting system at the tool tip. The Chinese patent numbered 201310409076.5 discloses a method for predicting the milling stability which considers multi-mode coupled dynamic characteristics at the tool tip, and the impact strategy is similar with that in REF. 1, but identifying multiple modes p respectively in two independent directions (X and Y direction). In addition, this method matches the dynamic parameters of the same mode order and uses them to draw corresponding stability lobes, and finally takes the lowest envelops of the stability lobes of different mode order to form the ultimate stability lobes. The common characteristics of above literatures and patent are that all of them assume that the dynamic behaviors of the cutting system occur at the tool tip. And they ignore the changes of the dynamic characteristics along the cutter axis, as a result, the identified results from impact tests can't always meet the accuracy requirement of the system dynamic model. This may further leads to a certain degree of distortion within some speed ranges of the predicted stability lobes, especially under larger axial cutting conditions. REF.3 (C. Eksioglu, Z. M. Kilic, Y. Altintas, *Discrete-Time Prediction of Chatter Stability, Cutting Forces, and Surface Location Errors in Flexible Milling Systems, Journal of Manufacturing Science and Engineering*. 134 (2012) 61006) presents a dynamic model considering the multi-point contact between the cutter and workpiece. Its characteristics are: as shown in FIG. 1(a), a single-axial acceleration sensor is installed at the tool tip, and the measuring direction is ensured to be always parallel to the impact direction. However, the hammer impacts at not only the tool tip (Node 1) but also in turn at multiple nodes (such as Node 2, . . . , q) . Although this method takes into account dynamic characteristics of cross-point mode couplings for the cutting system, but effects of cross-axis mode coupling are ignored. At present, dynamic characteristics of cross-axis and cross-point mode couplings for the cutting system are not considered in relevant literatures and patents. One can infer that new system transfer function processing and dynamic parameter identification techniques will be involved in the modal testing strategy with the simultaneous consideration of the cross-axis and cross-point mode couplings.

SUMMARY

In view of the deficiency of existing methods, the present invention provides a cross-axis and cross-point modal testing and parameter identification method for the cutting stability prediction, so as to obtain the dynamic parameters of cutting system that take both the cross-axis and cross-point mode couplings into consideration. As shown in FIG. 1(a) and (b), the method firstly installs a miniature tri-axial acceleration sensor at the tool tip, and conducts cross-axis and cross-point experimental modal tests respectively in two horizontally orthogonal directions at preset nodes of the cutter axis using a force hammer. The measured transfer functions are grouped according to different measuring axes, and the dynamic parameters (modal mass, damping, stiffness and mode shape) are separately identified from each group of transfer functions. Then, the contact region between the cutter and workpiece is divided into several cutting layer differentials along the cutter axis under the condition of a given axial cutting depth, and the differentials of each layer are allocated with the value of the mode shape identified at preset nodes through linear interpolation. After that, together with other dynamic parameters, all the parameters are assembled into system dynamic parameter matrices matching with the dynamic model. Finally, dynamic parameter matrices including the effects of cross-axis and cross-point model couplings are obtained. Taking the cylindrical milling process as an example, the specific steps adopted are:

Step 1 Install the cutter in the handle, clamp the handle in the machine tool spindle, and establish cutter coordinate system: the origin of coordinates is set on the free end of the cutter, the feed direction of cutter is set as the X axis, the direction perpendicular to the surface to be machined is set as Y axis wherein the outward direction for down milling and inward direction for up milling, and the Z axis is set as the direction away from the free end of the cutter and along the cutter axis.

Step 2 Starting from the free end of the cutter in a certain distance along the cutter axis, mark q nodes which will be impacted by the hammer, install a miniature tri-axial acceleration sensor at the tool tip, and impact at each node in two horizontally orthogonal X and Y directions with the hammer, to measure all the transfer functions of the spindle-handle-cutter system at each node.

Step 3 For the transfer functions measured via Step 2, eliminate all transfer functions measured by Z axis of the acceleration sensor, and then divide the remaining transfer functions into two different transfer function groups according to the vibration response measured by X or Y axis of the acceleration sensor, and the two groups of transfer function are marked as $\{FRF_x\}$ and $\{FRF_y\}$, respectively.

Step 4 Identify the dynamic parameters respectively from the two groups of different transfer functions $\{FRF_x\}$ and $\{FRF_y\}$ obtained in Step 3. Based on $\{FRF_x\}$, the identified previous m order dynamic parameters are expressed as follows. Natural frequencies are $\omega_{nx,1}, \omega_{nx,2}, \ldots, \omega_{nx,m}$. Damping ratios are $\xi_{x,1}, \xi_{x,2}, \ldots, \xi_{x,m}$. Mode shape matrix is $\psi_x=[\varphi_{x,1}\varphi_{x,2} \cdots \varphi_{x,m}]_{2q \times m}$, where the dimension of $\varphi_{x,j}(j=1, 2, \ldots, m)$ is $2q \times 1$ and $\varphi_{x,j}$ represents the j-th order mode shape vector corresponding to each impact node in the principle vibration direction of X direction. Based on $\{FRF_y\}$, the identified previous m order dynamic parameters are expressed as follows. Natural frequencies are $\omega_{ny,1}, \omega_{ny,2}, \ldots, \omega_{ny,m}$. Damping ratios are $\xi_{y,1}, \xi_{y,2}, \ldots, \xi_{y,m}$. Mode shape matrix is $\psi_y=[\varphi_{y,1}\varphi_{y,2} \cdots \varphi_{y,m}]_{2q \times m}$, where the dimension of $\varphi_{y,j}(j=1, 2, \ldots, m)$ is $2q \times 1$ and $\varphi_{y,j}$ represents the j-th order mode shape vector corresponding to each impact node in the principle vibration direction of Y direction.

Step 5 Divide the contact region between the cutter and workpiece under a given axial cutting depth $\alpha_p$ along the cutter axis into p cutting layer differentiators. According to the relative position between the center of each differentiator and above impact nodes, allocate these differentiators the value of the mode shape identified by Step 4 through linear interpolation.

Step 6 According to different modal order, assemble different types of dynamic parameters into modal mass, damping, stiffness and mode shape matrices, and these matrices should match the system dynamic model. After assembly, one can obtain:

modal mass matrix $$M = \begin{bmatrix} 1 & & & & & & \\ & 1 & & & & & \\ & & 1 & & & & \\ & & & 1 & & & \\ & & & & \ddots & & \\ & & & & & 1 & \\ & & & & & & 1 \end{bmatrix}_{2m \times 2m};$$

modal damping matrix $$C = \begin{bmatrix} 2\xi_{x,1}\omega_{nx,1} & & & & & & 0 \\ & 2\xi_{y,1}\omega_{ny,1} & & & & & \\ & & 2\xi_{x,2}\omega_{nx,2} & & & & \\ & & & 2\xi_{y,2}\omega_{ny,2} & & & \\ & & & & \ddots & & \\ & & & & & 2\xi_{x,m}\omega_{nx,m} & \\ 0 & & & & & & 2\xi_{y,m}\omega_{ny,m} \end{bmatrix}_{2m \times 2m};$$

modal stiffness matrix $$K = \begin{bmatrix} \omega_{nx,1}^2 & & & & & & 0 \\ & \omega_{ny,1}^2 & & & & & \\ & & \omega_{nx,2}^2 & & & & \\ & & & \omega_{ny,2}^2 & & & \\ & & & & \ddots & & \\ & & & & & \omega_{nx,m}^2 & \\ 0 & & & & & & \omega_{ny,m}^2 \end{bmatrix}_{2m \times 2m};$$

mode shape matrix: $\psi=[\tilde{\varphi}_{x,1}\ \tilde{\varphi}_{y,1}\ \tilde{\varphi}_{x,2}\ \tilde{\varphi}_{y,2} \cdots \tilde{\varphi}_{x,m}\ \tilde{\varphi}_{y,m}]_{2p \times 2m}$, where the dimension of $\tilde{\varphi}_{d,j}(j=1, 2, \ldots, m; d=x\text{ or }y)$ is $2p \times 1$ and $\tilde{\varphi}_{d,j}$ represents the j-th order mode shape vector corresponding to each cutting layer differentiator in the principle vibration direction of X or Y direction.

The present invention has the beneficial effects that the method firstly installs a miniature tri-axial acceleration sensor at the tool tip, and conducts cross-axis and cross-point experimental modal tests respectively in two horizontally orthogonal directions at preset nodes of the cutter axis using a force hammer The measured transfer functions are grouped according to different measuring axes, and the dynamic parameters (modal mass, damping, stiffness and mode shape) are separately identified from each group of transfer functions. Then, the contact region between the cutter and workpiece is divided into several cutting layer differentials along the cutter axis under the condition of a given axial cutting depth, and the differentials of each layer are allocated with the value of the mode shape identified at preset nodes through linear interpolation. After that, together with other dynamic parameters, all the parameters are assembled into system dynamic parameter matrices matching with the dynamic model. Finally, dynamic parameter matrices including the effects of cross-axis and cross-point model couplings are obtained. This method can significantly improve the accuracy of existing methods for predicting cutting stability, and further get more accurate stability lobes. Moreover, the acceleration sensor in the method only needs to be installed once.

DETAILED DESCRIPTION

Figure 1:
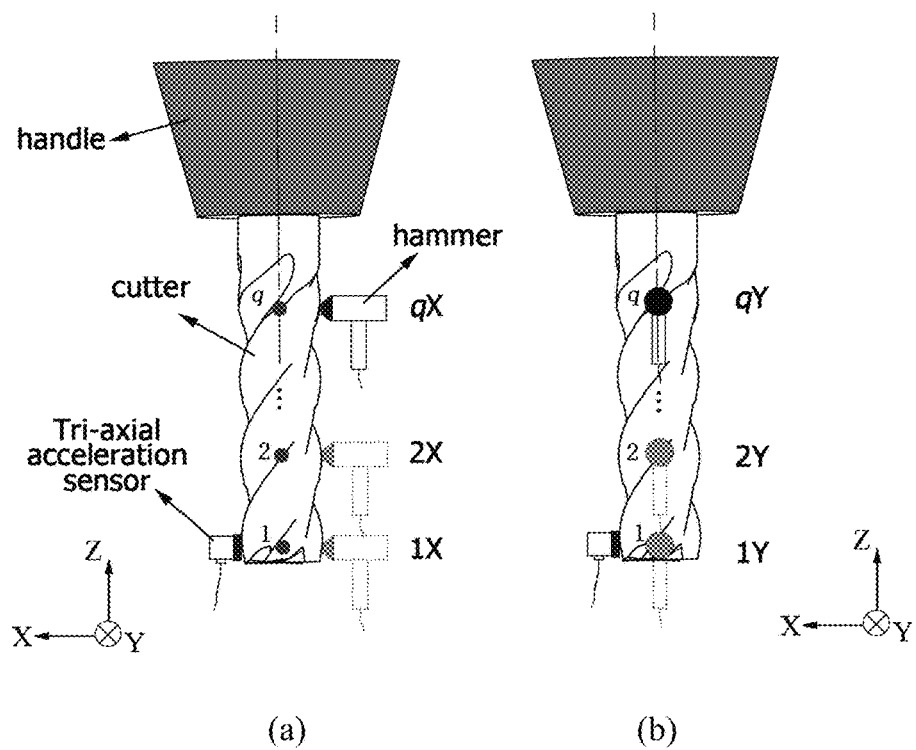
FIG. 1 is a graphical representation of cross-axis and cross-point modal testing of the present invention: (a) denotes the hammer impacting at the nodes one by one in X direction; (b) denotes the hammer impacting at the nodes one by one in Y direction.

Below, with the combination of attached drawings and technical solution, the concrete implementation process of the invention is explained in detail. As shown in FIGS. 1(a) and (b), the method firstly installs a miniature tri-axial acceleration sensor at the tool tip, and conducts cross-axis and cross-point experimental modal tests respectively in two horizontally orthogonal directions (X and Y directions) at preset nodes of the cutter axis using a force hammer The measured transfer functions are grouped according to different measuring axes, and the dynamic parameters (modal mass, damping, stiffness and mode shape) are separately identified from each group of transfer functions. Then, the contact region between the cutter and the workpiece is divided into several cutting layer differentials along the cutter axis under the condition of a given axial cutting depth, and the differentials of each layer are allocated with the value of the mode shape identified at preset nodes through linear interpolation. After that, together with other dynamic parameters, all the parameters are assembled into system dynamic parameter matrices matching with the dynamic model. Finally, dynamic parameter matrices including the effects of cross-axis and cross-point model couplings are obtained. Taking the cylindrical milling process as an example, the specific steps adopted are:

Step 1 Install the cutter in the handle, clamp the handle in the machine tool spindle, and establish cutter coordinate system: the origin of coordinates is set on the free end of the cutter, the feed direction of cutter is set as the X axis, the direction perpendicular to the surface to be machined is set as Y axis (outward for down milling and inward for up milling), and the Z axis is set as the direction away from the free end of the cutter and along the cutter axis.

Step 2 Starting from the free end of the cutter in a certain distance along the cutter axis, mark q nodes which will be impacted by the hammer, install a miniature tri-axial acceleration sensor at the tool tip, and impact at each node in two horizontally orthogonal X and Y directions with the hammer, to measure all the transfer functions of the spindle-handle-cutter system at each node.

Figure 2:
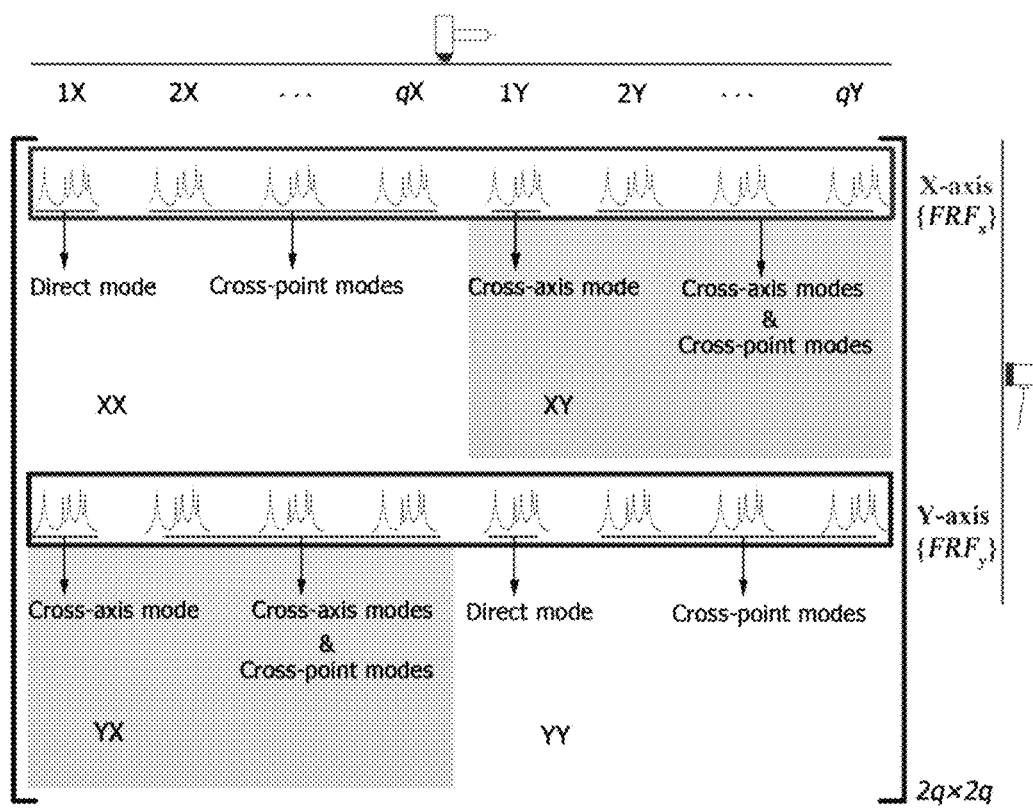
FIG. 2 is a graphical representation of the transfer function groups according to the vibration response measured by X or Y axis of the tri-axial acceleration sensor.

Step 3 For the transfer functions measured via Step 2, eliminate all transfer functions measured by Z axis of the acceleration sensor, and then divide the remaining transfer functions into two different transfer function groups according to the vibration response measured by X or Y axis of the acceleration sensor, and the two groups of transfer function are marked as $\{FRF_x\}$ and $\{FRF_y\}$, respectively, as shown in FIG. 2.

Step 4 Identify the dynamic parameters respectively from the two groups of different transfer functions $\{FRF_x\}$ and $\{FRF_y\}$ obtained in Step 3. Based on $\{FRF_x\}$, the identified previous in order dynamic parameters are expressed as follows. Natural frequencies are $\omega_{nx,1}, \omega_{nx,2}, \ldots, \omega_{nx,m}$. Damping ratios are $\xi_{x,1}, \xi_{x,2}, \ldots, \xi_{x,m}$. Mode shape matrix is $\psi_x = [\varphi_{x,1}, \varphi_{x,2}, \ldots, \varphi_{x,m}]_{2q \times m}$, where the dimension of $\varphi_{x,j}$ (j=1, 2, ..., m) is $2q \times 1$ and $\varphi_{x,j}$ represents the j-th order mode shape vector corresponding to each impact node in the principle vibration direction of X direction. Based on $\{FRF_y\}$, the identified previous in order dynamic parameters are expressed as follows. Natural frequencies are $\omega_{ny,1}, \omega_{ny,2}, \ldots, \omega_{ny,m}$. Damping ratios are $\xi_{y,1}, \xi_{y,2}, \ldots, \xi_{y,m}$. Mode shape matrix is $\psi_y = [\varphi_{y,1}, \varphi_{y,2}, \ldots, \varphi_{y,m}]_{2q \times m}$, where the dimension of $\varphi_{y,j}$ (j=1,2, ..., m) is $2q \times 1$ and $\varphi_{y,j}$ represents the j-th order mode shape vector corresponding to each impact node in the principle vibration direction of Y direction $\psi_x$ and $\psi_y$ can be expressed as follows, respectively:

$$\Psi_x = \begin{bmatrix} u_{x,x,1,1} & u_{x,x,1,2} & \cdots & u_{x,x,1,m} \\ u_{x,y,1,1} & u_{x,y,1,2} & \cdots & u_{x,y,1,m} \\ u_{x,x,2,1} & u_{x,x,2,2} & \cdots & u_{x,x,2,m} \\ u_{x,y,2,1} & u_{x,y,2,2} & \cdots & u_{x,y,2,m} \\ \vdots & \vdots & \vdots & \vdots \\ u_{x,x,q,1} & u_{x,x,q,2} & \cdots & u_{x,x,q,m} \\ u_{x,y,q,1} & u_{x,y,q,2} & \cdots & u_{x,y,q,m} \end{bmatrix}_{2q \times m} ;$$

$$\Psi_y = \begin{bmatrix} u_{y,x,1,1} & u_{y,x,1,2} & \cdots & u_{y,x,1,m} \\ u_{y,y,1,1} & u_{y,y,1,2} & \cdots & u_{y,y,1,m} \\ u_{y,x,2,1} & u_{y,x,2,2} & \cdots & u_{y,x,2,m} \\ u_{y,y,2,1} & u_{y,y,2,2} & \cdots & u_{y,y,2,m} \\ \vdots & \vdots & \vdots & \vdots \\ u_{y,x,q,1} & u_{y,x,q,2} & \cdots & u_{y,x,q,m} \\ u_{y,y,q,1} & u_{y,y,q,2} & \cdots & u_{y,y,q,m} \end{bmatrix}_{2q \times m}$$

where $u_{d,c,\alpha,\beta}$ (d=x or y, c=x or y, $\alpha$=1, 2, ..., q, $\beta$=1, 2, ..., m) is the value of the $\beta$-th order mode shape of the $\alpha$-th impact node in c direction with the principle vibration direction of d direction Step 5 Divide the contact region between the cutter and workpiece under a given axial cutting depth $\alpha_p$ along the cutter axis into p cutting layer differentiators. According to the relative position between the center of each differentiator and above impact nodes, allocate these differentiators the value of the mode shape identified by Step 4 through linear interpolation.

Step 6 According to different modal order, assemble different types of dynamic parameters into modal mass, damping, stiffness and mode shape matrices and these matrices should match the system dynamic model. After assembly, one can obtain:

modal mass matrix:

$$M = \begin{bmatrix} 1 & & & & & & \\ & 1 & & & & & \\ & & 1 & & & & \\ & & & 1 & & & \\ & & & & \ddots & & \\ & & & & & 1 & \\ & & & & & & 1 \end{bmatrix}_{2m \times 2m};$$

modal damping matrix:

$$C = \begin{bmatrix} 2\xi_{x,1}\omega_{nx,1} & & & & & & 0 \\ & 2\xi_{y,1}\omega_{ny,1} & & & & & \\ & & 2\xi_{x,2}\omega_{nx,2} & & & & \\ & & & 2\xi_{y,2}\omega_{ny,2} & & & \\ & & & & \ddots & & \\ & & & & & 2\xi_{x,m}\omega_{nx,m} & \\ 0 & & & & & & 2\xi_{y,m}\omega_{ny,m} \end{bmatrix}_{2m \times 2m};$$

modal stiffness matrix:

$$K = \begin{bmatrix} \omega_{nx,1}^2 & & & & & & 0 \\ & \omega_{ny,1}^2 & & & & & \\ & & \omega_{nx,2}^2 & & & & \\ & & & \omega_{ny,2}^2 & & & \\ & & & & \ddots & & \\ & & & & & \omega_{nx,m}^2 & \\ 0 & & & & & & \omega_{ny,m}^2 \end{bmatrix}_{2m \times 2m};$$

mode shape matrix:

$$\Psi = \begin{bmatrix} \tilde{u}_{x,x,1,1} & \tilde{u}_{y,x,1,1} & \tilde{u}_{x,x,1,2} & \tilde{u}_{x,y,1,2} & \cdots & \tilde{u}_{x,x,1,m} & \tilde{u}_{x,y,1,m} \\ \tilde{u}_{x,y,1,1} & \tilde{u}_{y,y,1,1} & \tilde{u}_{x,y,1,2} & \tilde{u}_{y,y,1,2} & \cdots & \tilde{u}_{x,y,1,m} & \tilde{u}_{y,y,1,m} \\ \tilde{u}_{x,x,2,1} & \tilde{u}_{y,x,2,1} & \tilde{u}_{x,x,2,2} & \tilde{u}_{y,x,2,2} & \cdots & \tilde{u}_{x,x,2,m} & \tilde{u}_{y,x,2,m} \\ \tilde{u}_{x,y,2,1} & \tilde{u}_{y,y,2,1} & \tilde{u}_{x,y,2,2} & \tilde{u}_{y,y,2,2} & \cdots & \tilde{u}_{x,y,2,m} & \tilde{u}_{y,y,2,m} \\ \vdots & \vdots & \vdots & \vdots & \vdots & \vdots & \vdots \\ \tilde{u}_{x,x,p,1} & \tilde{u}_{y,x,p,1} & \tilde{u}_{x,x,p,2} & \tilde{u}_{y,x,p,2} & \cdots & \tilde{u}_{x,x,p,m} & \tilde{u}_{y,x,p,m} \\ \tilde{u}_{x,y,p,1} & \tilde{u}_{y,y,p,1} & \tilde{u}_{x,y,p,2} & \tilde{u}_{y,y,p,2} & \cdots & \tilde{u}_{x,y,p,m} & \tilde{u}_{y,y,p,m} \end{bmatrix}_{2p \times 2m}$$

where $\tilde{u}_{\tilde{d},\tilde{c},\tilde{\alpha},\tilde{\beta}}$ ($\tilde{d}$=x or y, $\tilde{c}$=x or y, $\tilde{\alpha}$=1, 2, . . . , p, $\tilde{\beta}$=1, 2 . . . , m) is the value of the $\tilde{\beta}$-th order mode shape of the $\tilde{\alpha}$-th cutting layer differentiator in $\tilde{c}$ direction with the principle vibration direction of $\tilde{d}$ direction.

The invention claimed is:

1. A cross-axis and cross-point modal testing and parameter identification method for predicting cutting stability, wherein the following steps are comprised:

step 1 install a cutter in a handle, clamp the handle in a machine tool spindle, and establish cutter coordinate system: the origin of coordinates is set on the free end of the cutter, the feed direction of cutter is set as the X axis, the direction perpendicular to the surface to be machined is set as Y axis wherein the outward direction for down milling and inward direction for up milling, and the Z axis is set as the direction away from the free end of the cutter and along the cutter axis;

step 2 starting from the free end of the cutter in a certain distance along the cutter axis, mark q nodes which will be impacted by a hammer, install a miniature tri-axial acceleration sensor at the tool tip, and impact at each node in two horizontally orthogonal X and Y directions with the hammer, to measure all the transfer functions of a spindle-handle-cutter system at each node;

step 3 for the transfer functions measured via step 2, eliminate all transfer functions measured by Z axis of the acceleration sensor, and then divide the remaining transfer functions into two different transfer function groups according to the vibration response measured by X or Y axis of the acceleration sensor, and the two groups of transfer function are marked as $\{FRF_x\}$ and $\{FRF_y\}$, respectively;

step 4 identify the dynamic parameters respectively from the two groups of different transfer functions $\{FRF_x\}$ and $\{FRF_y\}$ obtained in Step 3; based on $\{FRF_x\}$, the identified previous m order dynamic parameters are expressed as follows; natural frequencies are $\omega_{nx,1}$, $\omega_{nx,2}$, . . . , $\omega_{nx,m}$; damping ratios are $\xi_{x,1}, \xi_{x,2}, \ldots, \xi_{x,m}$; mode shape matrix is $\psi_x=[\varphi_{x,1}\varphi_{x,2} \cdots \varphi_{x,m}]_{2q \times m}$, where the dimension of $\varphi_{x,j}$, j=1,2, . . . , m is 2q×1 and $\varphi_{x,j}$ represents the j-th order mode shape vector corresponding to each impact node in the principle vibration direction of X direction; based on $\{FRF_y\}$, the identified previous m order dynamic parameters are expressed as follows; natural frequencies are $\omega_{ny,1}$, $\omega_{ny,2}$, . . . , $\omega_{ny,m}$; damping ratios are $\xi_{y,1}, \xi_{y,2}, \ldots, \xi_{y,m}$; mode shape matrix is $\psi_y=[\varphi_{y,1}\varphi_{y,2} \cdots \varphi_{y,m}]_{2q \times m}$, where the dimension of $\varphi_{y,j}$(j=1,2, . . . , m) is 2q×1 and $\varphi_{y,j}$ represents the j-th order mode shape vector corresponding to each impact node in the principle vibration direction of Y direction;

step 5 divide a contact region between the cutter and a workpiece under a given axial cutting depth $\alpha_p$ along the cutter axis into p cutting layer differentiators; according to the relative position between the center of each differentiator and above impact nodes, allocate these differentiators a value of a mode shape identified by step 4 through linear interpolation;

step 6 according to different modal order, assemble different types of dynamic parameters into modal mass, damping, stiffness and mode shape matrices, and these matrices match a system dynamic model; after assembly, obtaining:

model mass matrix $$M = \begin{bmatrix} 1 & & & & & & \\ & 1 & & & & & \\ & & 1 & & & & \\ & & & 1 & & & \\ & & & & \ddots & & \\ & & & & & 1 & \\ & & & & & & 1 \end{bmatrix}_{2m \times 2m};$$

modal damping matrix $$C = \begin{bmatrix} 2\xi_{x,1}\omega_{nx,1} & & & & & & 0 \\ & 2\xi_{y,1}\omega_{ny,1} & & & & & \\ & & 2\xi_{x,2}\omega_{nx,2} & & & & \\ & & & 2\xi_{y,2}\omega_{ny,2} & & & \\ & & & & \ddots & & \\ & & & & & 2\xi_{x,m}\omega_{nx,m} & \\ 0 & & & & & & 2\xi_{y,m}\omega_{ny,m} \end{bmatrix}_{2m \times 2m};$$

modal stiffness matrix $$K = \begin{bmatrix} \omega_{nx,1}^2 & & & & & & 0 \\ & \omega_{ny,1}^2 & & & & & \\ & & \omega_{nx,2}^2 & & & & \\ & & & \omega_{ny,2}^2 & & & \\ & & & & \ddots & & \\ & & & & & \omega_{nx,m}^2 & \\ 0 & & & & & & \omega_{ny,m}^2 \end{bmatrix}_{2m \times 2m};$$

mode shape matrix: $\psi = [\tilde{\varphi}_{x,1} \ \tilde{\varphi}_{y,1} \ \tilde{\varphi}_{x,2} \ \tilde{\varphi}_{y,2} \cdots \tilde{\varphi}_{x,m} \ \tilde{\varphi}_{y,m}]_{2p \times 2m}$, where the dimension of $\tilde{\varphi}_{d,j}$ (j=1,2, . . . , m; d=x or y) is 2p×1 and $\tilde{\varphi}_{d,j}$ represents the j-th order mode shape vector corresponding to each cutting layer differentiator in the principle vibration direction of X or Y direction.

* * * * *